(12) United States Patent
Corneliβen

(10) Patent No.: US 11,320,258 B2
(45) Date of Patent: May 3, 2022

(54) APPARATUS AND METHOD FOR EDGE DETECTION WHEN MACHINING WORKPIECES

(71) Applicant: II-VI Delaware, Inc., Wilmington, DE (US)

(72) Inventor: Mathias Corneliβen, Birkenwerder (DE)

(73) Assignee: II-VI DELAWARE, INC., Wilmington, DE (US)

( * ) Notice: Subject to any disclaimer, the term of this patent is extended or adjusted under 35 U.S.C. 154(b) by 48 days.

(21) Appl. No.: 16/710,700

(22) Filed: Dec. 11, 2019

(65) Prior Publication Data
US 2021/0172724 A1    Jun. 10, 2021

(30) Foreign Application Priority Data
Dec. 10, 2019   (DE) ............... 10 2019 133 695.3

(51) Int. Cl.
*G01B 11/02*     (2006.01)

(52) U.S. Cl.
CPC ................... *G01B 11/028* (2013.01)

(58) Field of Classification Search
CPC ................................... G01B 11/028
USPC ........................................ 356/369
See application file for complete search history.

(56) References Cited

U.S. PATENT DOCUMENTS

| 2006/0001970 | A1* | 1/2006 | Facius | G02B 27/145 |
| | | | | 359/489.17 |
| 2010/0091281 | A1* | 4/2010 | Suzuki | G01B 11/028 |
| | | | | 356/364 |
| 2014/0185044 | A1* | 7/2014 | Ishikawa | G01N 21/956 |
| | | | | 356/369 |

FOREIGN PATENT DOCUMENTS

| EP | 2062674 A1 | 5/2009 |
| WO | WO-2019043231 A1 | 3/2019 |

* cited by examiner

*Primary Examiner* — Sunghee Y Gray
(74) *Attorney, Agent, or Firm* — Blank Rome LLP

(57) ABSTRACT

An apparatus and method for detecting edges or for seam tracking when machining workpieces by means of a laser beam, e.g. joining or cutting. The present invention provides an apparatus for seam tracking of the process in the laser material processing, comprising at least two separate illumination elements, each emitting differently polarized light and a polarization camera.

20 Claims, 3 Drawing Sheets

APPARATUS AND METHOD FOR EDGE DETECTION WHEN MACHINING WORKPIECES

BACKGROUND OF THE INVENTION

Filed of the Invention

The present invention relates to an apparatus and a method for detection of edges or seam tracking when machining workpieces by means of a laser beam, e.g. joining or cutting. The machining can be a laser material processing of workpieces in three-dimensional space.

Brief Description of the Related Art

During laser material processing of workpieces, seam tracking is used for process monitoring, regulation or control and for quality management. For this purpose, mostly image processing systems are used.

Edge detection is an essential step in seam tracking. From the prior art methods and systems are known in which the camera image of an optical camera is evaluated by means of special algorithms. The evaluation is based on a monochrome image, from which the intensity of the light reflected into the camera is utilized as image information. With optically difficult materials, which have only a small or very diffuse reflection, there are difficulties in the evaluation, since often only very poor and low-contrast images are available. Such materials may have, for example, matte or dark surfaces.

Remote laser welding is a special variant of laser beam welding. In this method, welding can be performed in any direction in three-dimensional space, and the direction may also change during the welding operation. This is a difference in comparison to other welding processes, which usually only weld in one direction. In such devices, detectors or guide elements are used, which run ahead of the joining process.

Furthermore, in the methods known from the prior art several recordings with different optical filters of the machining process of the workpieces are needed to allow reliable control. For this purpose, the required information is calculated by means of special algorithms.

Furthermore, in methods known from the prior art, it is usually also necessary to use a plurality of cameras in order to obtain the required image data.

There is a need for an apparatus and a method which allow even with optically difficult materials to ensure reliable seam tracking.

SUMMARY OF THE INVENTION

It is therefore an object of the present invention to provide a novel apparatus and a novel method for seam tracking.

The present invention provides an apparatus for seam tracking of the process in laser material processing, comprising at least two separate illumination elements, each emitting differently polarized light, and a polarization camera.

In a further aspect of the invention, it is provided that the at least two separate illumination elements each emit light having polarization rotated by 90°.

Furthermore, an embodiment is provided, comprising four separate illumination elements.

In a further aspect of the invention, an apparatus may also comprise an even multiple number of illumination elements.

If more than two illumination elements are used, it is provided that in each case two of the separate illumination elements emit identically polarized light.

Furthermore, it is provided that then the at least two separate illumination elements, which emit identically polarized light, are arranged opposite to each other.

In a further aspect of the invention it is provided that the polarization camera is arranged coaxially to a laser beam for material processing.

Another object of the present invention is a method for seam tracking in laser material processing, comprising the steps:
a. Use at least two separate illumination elements to illuminate the area of interest with polarized light;
b. Capturing at least one image of the illuminated area of interest with a polarization camera;
c. Transferring the at least one image to an evaluation unit;
d. Evaluation of the at least one image.

In the method according to the invention, the two separate illumination elements may emit light having polarization rotated by 90°.

In a further aspect of the invention, it is provided for the method that the evaluation unit is a device for data processing.

The method according to the invention can also be designed such that four separate illumination elements are used.

Furthermore, in each case two of the four illumination elements can emit identically polarized light when carrying out the method.

The method may, in another aspect of the present invention, comprise the arrangement of the illumination elements with identically polarized light opposite each other.

Another object of the present invention relates to a laser material processing head comprising an apparatus for seam tracking in laser material processing as described above.

A method of using an apparatus as described above for seam tracing in a remote laser welding process is a further object of the present invention.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

The invention will now be described on the basis of figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The above-mentioned object of the invention is solved by the features of the independent claims. The dependent claims cover further specific embodiments of the invention.

The invention provides an apparatus and a method in which an image evaluation is possible even with only slight or diffuse contrasts of the materials or even with highly reflective materials. When reflecting on metallic surfaces, or reflective surfaces in general, there may be a change in the polarization properties of the reflected light compared to the incident light.

The present invention is based on the use of a polarization camera. Thus, it is possible in addition to the pure optical image data also additionally to determine the polarization properties of the reflected light. For reflections on differently inclined surfaces, the polarization of the light also changes.

Furthermore, the invention provides that the camera is arranged coaxially to the laser beam, with which a workpiece is processed.

Furthermore, it has been found in experiments using a polarization camera that the use of polarized light to illuminate the workpiece is advantageous. In this respect, polarized light sources or the use of polarizing filters for the light sources are an essential element of the present invention.

Experiments have shown that the use of at least two different polarized light sources is advantageous. It is furthermore advantageous if the at least two light sources have a polarization direction rotated by 90° with respect to another.

Four light sources can also be used. In this case, two light sources each have an identical polarization direction and the two pairs with identical polarization direction are arranged opposite to one another. In principle, an odd number of lighting elements or light sources is within the scope of the invention.

According to the invention polarization cameras will be used, in which only one frame of a recording or captured image is sufficient for evaluation.

The inventive method is advantageous because not only the purely optical properties of the image are taken as a basis, but due to the inclusion of the polarization of the reflected light contrast-sharp images arise, which can then be evaluated by means of a suitable algorithm. The stronger contrast leads to a better recognition.

Figure 1:
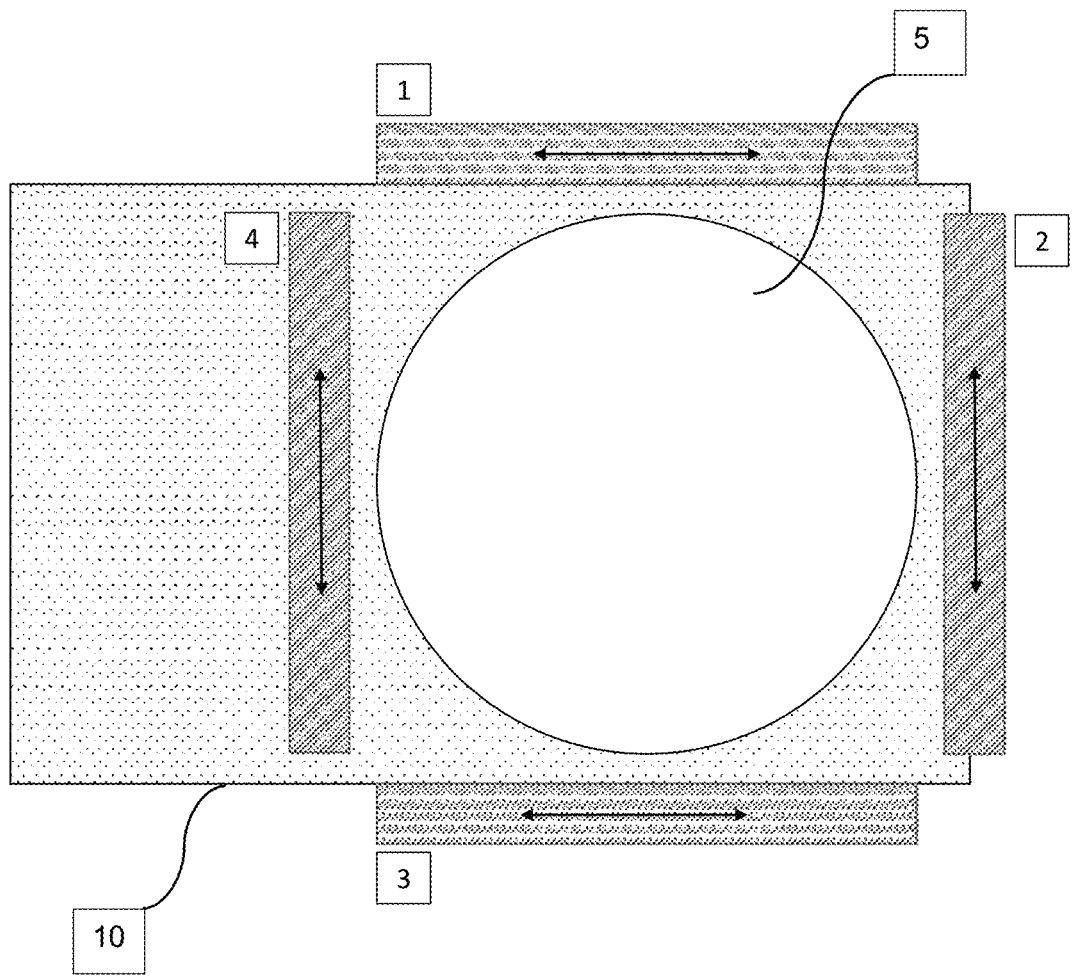
FIGS. 1 and 2 show an optic of a remote laser welding head from below with different polarization directions of the illumination elements.

FIG. 1 shows the optics of a remote laser welding head from below. Four illumination elements 1, 2, 3, 4 are arranged laterally around the outlet opening of the laser processing optics 5. The arrows indicate the polarization direction of the individual illumination elements 1, 2, 3, 4. Opposite illumination elements each have the same direction of polarization, respectively emitted polarized light. In FIG. 1 is the polarization direction of the lighting elements 1, 2, 3, 4 along their longitudinal direction. The polarization is achieved by polarizing filters (not shown separately) in front of the lighting elements 1, 2, 3, 4.

Figure 2:
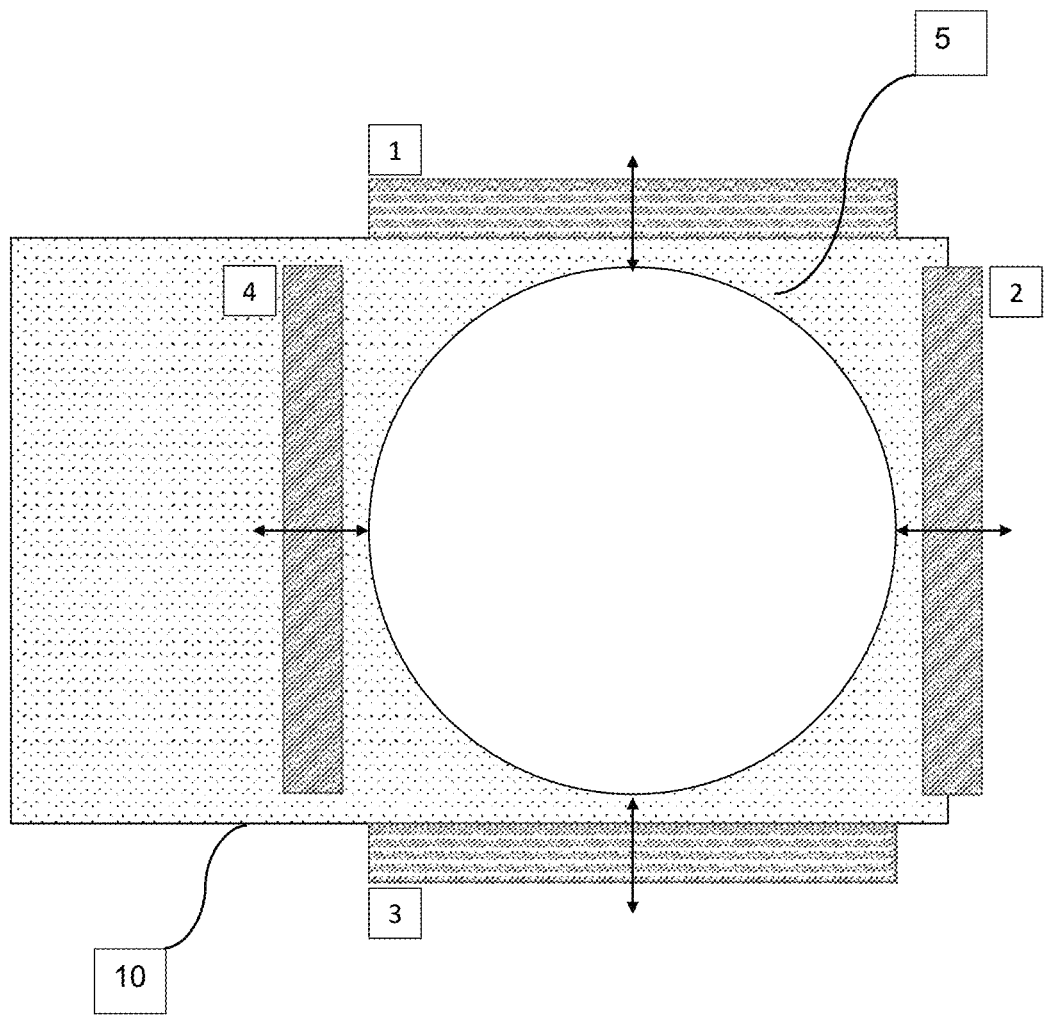

In FIG. 2 are also four illumination elements 1, 2, 3, 4 arranged around the camera 5. Here, the polarization filters (not shown separately) lead to a polarization of the light of the illumination elements 1, 2, 3, 4 transversely or perpendicular to the longitudinal extent of the illumination elements.

Figure 3:
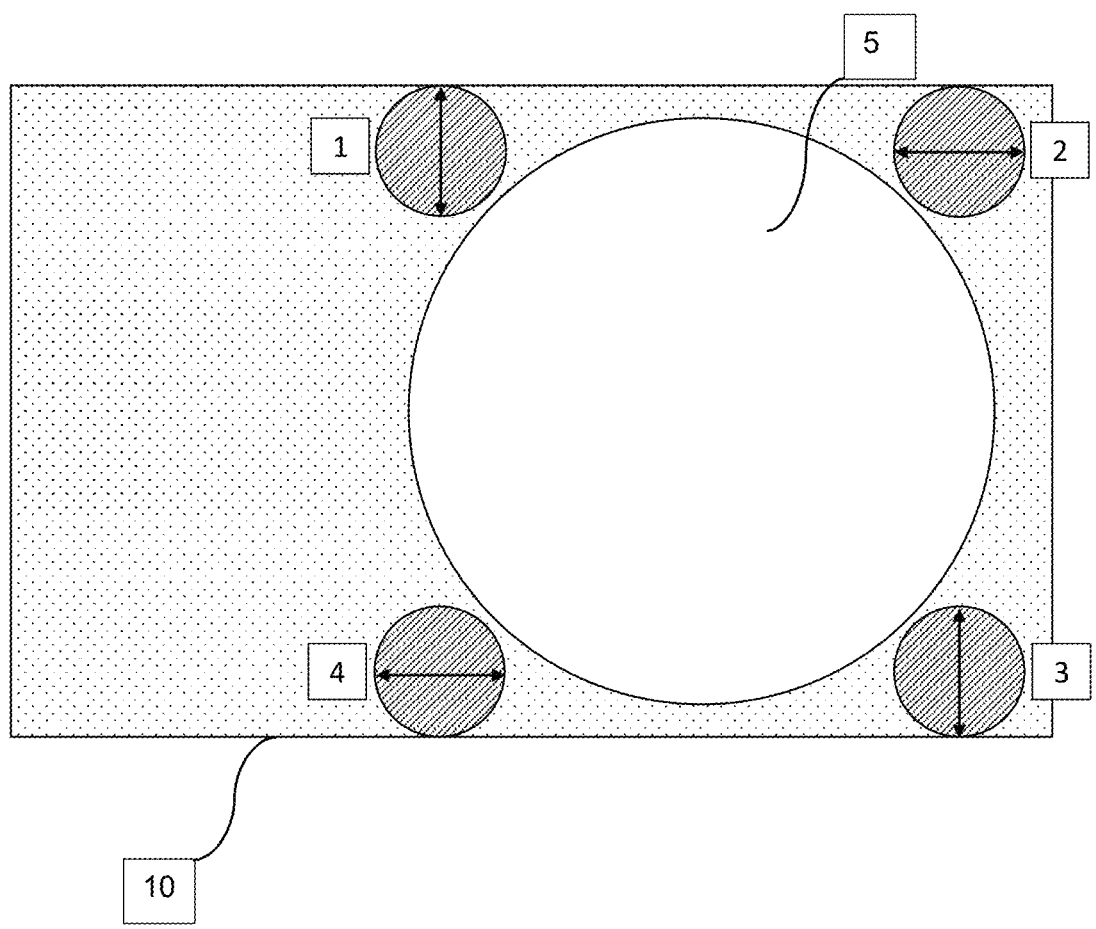
FIG. 3 shows an optic of a remote laser welding head from below with an alternative arrangement of the illumination elements.

FIG. 3 shows an alternative arrangement of the illumination elements 1, 2, 3, 4. These are arranged in the corners of the housing of the laser welding head 10. Opposing illumination elements in the diagonal, i.e. 1, 3 and 2, 4 have an identical polarization direction of the emitted light.

It can be seen from FIGS. 1 to 3 that the polarization direction of the two pairs is in each case rotated by 90° with respect to one another.

In principle, 2, 4, 6, 8 or any other even multiple of lighting elements are conceivable. Importantly, the lighting elements are present in pairs and the lighting elements of a pair face each other, with both lighting elements having the same polarization direction of the emitted light.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS

1-4 illumination elements
5 Beam extraction of the laser processing optics, which also acts as imaging optics for the camera
10 Housing laser welding head

What is claimed is:

1. A method for seam tracking in laser material processing, comprising the steps:
    using a plurality of separate illumination elements to illuminate an area of interest by emitting first identically polarized light with a first pair of the separate illumination elements and emitting second identically polarized light with a second pair of the separate illumination elements;
    capturing at least one image of the illuminated area of interest with a polarization camera;
    transferring the at least one image to an evaluation unit; and
    evaluating the at least one image.

2. The method of claim 1, wherein emitting the first and second identically polarized light comprises emitting the first identically polarized light having polarization rotated by 90° relative to the second identically polarized light.

3. The method of claim 1, wherein the evaluation unit is a device for data processing.

4. The method of claim 1, wherein the separate illumination elements in the first pair with the first identically polarized light are arranged opposite each other; and wherein the separate illumination elements in the second pair with the second identically polarized light are arranged opposite each other.

5. The method of claim 1, wherein evaluating the at least one image comprises determining contrast in the at least one image based on polarization properties of reflected light on differently inclined surfaces in the area of interest.

6. The method of claim 1, wherein using the separate illumination elements comprises using light sources that are polarized or using polarizing filters with the light sources.

7. The method of claim 1, wherein emitting the first identically polarized light using the separate illumination elements in the first pair comprises emitting the first identically polarized light in a polarization direction along a longitudinal direction of the separate illumination elements in the first pair.

8. The method of claim 1, wherein emitting the first identically polarized light using the separate illumination elements in the first pair comprises emitting the first identically polarized light in a first polarization direction perpendicular to a first longitudinal direction of the separate illumination elements in the first pair.

9. The method of claim 8, wherein emitting the second identically polarized light using the separate illumination elements in the second pair comprises emitting the second identically polarized light in a second polarization direction perpendicular to the second longitudinal direction of the separate illumination elements in the second pair, the first and second polarization directions being perpendicular to one another.

10. A method of using an apparatus for seam tracking in laser material processing, the method comprising the steps of:
   providing a plurality of separate illumination elements;
   emitting first polarized light using the separate illumination elements to illuminate an area of interest;
   emitting second polarized light using the separate illumination elements to illuminate the area of interest, the second polarized light being differently polarized than the first polarized light;
   capturing with a polarization camera at least one image of the area of interest illuminated with both of the first and second differently polarized light; and
   evaluating the at least one image to track the seam.

11. The method of claim 10, wherein emitting the first and second polarized light comprises emitting the first polarized light having polarization rotated by 90° relative to the second polarized light.

12. The method of claim 10, wherein providing the plurality of separate illumination elements comprises providing a total of four of the separate illumination elements, wherein a first pair of the total emit the first polarized light and a second pair of the total emit the second polarized light.

13. The method of claim 12, wherein the first separate illumination elements of the first pair are arranged opposite to each other, and wherein the second separate illumination elements of the second pair are arranged opposite to each other.

14. The method of claim 10, wherein providing the plurality of separate illumination elements comprises providing an even multiple number of the separate illumination elements for the first polarized light; and providing an even multiple number of the separate illumination elements for the second polarized light.

15. The method of claim 10, wherein the polarization camera is arranged coaxially to a laser beam for material processing.

16. The method of claim 10, wherein evaluating the at least one image comprises determining contrast in the at least one image based on polarization properties of reflected light on differently inclined surfaces in the area of interest.

17. The method of claim 10, wherein providing the plurality of separate illumination elements comprises using light sources that are polarized or using polarizing filters with the light sources.

18. The method of claim 10, wherein emitting the first polarized light using the separate illumination elements comprises emitting the first polarized light in a polarization direction along a longitudinal direction of the separate illumination elements.

19. The method of claim 10, wherein emitting the first polarized light using the separate illumination elements comprises emitting the first polarized light in a polarization direction perpendicular to a longitudinal direction of the separate illumination elements.

20. The method of claim 10, wherein emitting the first polarized light using the separate illumination elements comprises using the separate illumination elements arranged in a first pair facing one another and having a same first polarization direction; and wherein emitting the second polarized light using the separate illumination elements comprises using the separate illumination elements arranged in a second pair facing one another and having a same second polarization direction different from the first polarization direction.

* * * * *